United States Patent
Nakazono et al.

(10) Patent No.: US 8,982,235 B2
(45) Date of Patent: Mar. 17, 2015

(54) IMAGE PROCESSING DEVICE AND IMAGE PROCESSING METHOD

(71) Applicants: Olympus Corporation, Tokyo (JP); Olympus Imaging Corp., Tokyo (JP)

(72) Inventors: Keisuke Nakazono, Tokyo (JP); Yukihiro Sugimoto, Tokyo (JP); Shinsuke Homma, Tokyo (JP)

(73) Assignees: Olympus Corporation, Tokyo (JP); Olympus Imaging Corporation, Tokyo (JP)

( * ) Notice: Subject to any disclaimer, the term of this patent is extended or adjusted under 35 U.S.C. 154(b) by 150 days.

(21) Appl. No.: 13/654,625

(22) Filed: Oct. 18, 2012

(65) Prior Publication Data
US 2013/0100312 A1    Apr. 25, 2013

(30) Foreign Application Priority Data
Oct. 20, 2011   (JP) .................. 2011-230674

(51) Int. Cl.
| H04N 9/73 | (2006.01) |
| H04N 5/217 | (2011.01) |
| H04N 5/357 | (2011.01) |
| H04N 9/04 | (2006.01) |

(52) U.S. Cl.
CPC ............ *H04N 5/3572* (2013.01); *H04N 9/045* (2013.01)
USPC ....................................... 348/223.1; 348/241

(58) Field of Classification Search
CPC .............................. H04N 5/3572; H04N 9/045
USPC ................ 348/223.1; 382/215, 274, 275, 293
See application file for complete search history.

(56) References Cited

U.S. PATENT DOCUMENTS

| 8,118,953 B2* | 2/2012 | Iwamoto et al. ............. 148/659 |
| 8,335,398 B2* | 12/2012 | Omori ........................... 382/275 |
| 2002/0164083 A1* | 11/2002 | Song et al. .................... 382/275 |

FOREIGN PATENT DOCUMENTS

| JP | 2005-044098 A | 2/2005 |
| JP | 4179701 B2 | 9/2008 |

* cited by examiner

*Primary Examiner* — Trung Diep
(74) *Attorney, Agent, or Firm* — Westerman, Hattori, Daniels & Adrian, LLP

(57) ABSTRACT

An image processing device may include an image processing pipeline in which at least a magnification chromatic aberration correction processing unit that corrects magnification chromatic aberration of an imaging optical system, a distortion aberration correction processing unit that corrects distortion aberration of the imaging optical system, and an imaging processing unit that performs image processing with respect to image data and outputs image processed-image data to the distortion aberration correction processing unit are included in one pipeline, magnification chromatic aberration of the image data having been corrected by the magnification chromatic aberration correction processing unit, a sequencer that controls operations of respective elements included in the image processing pipeline, and a distortion correction range calculation unit that calculates a distortion aberration correction input range.

6 Claims, 9 Drawing Sheets

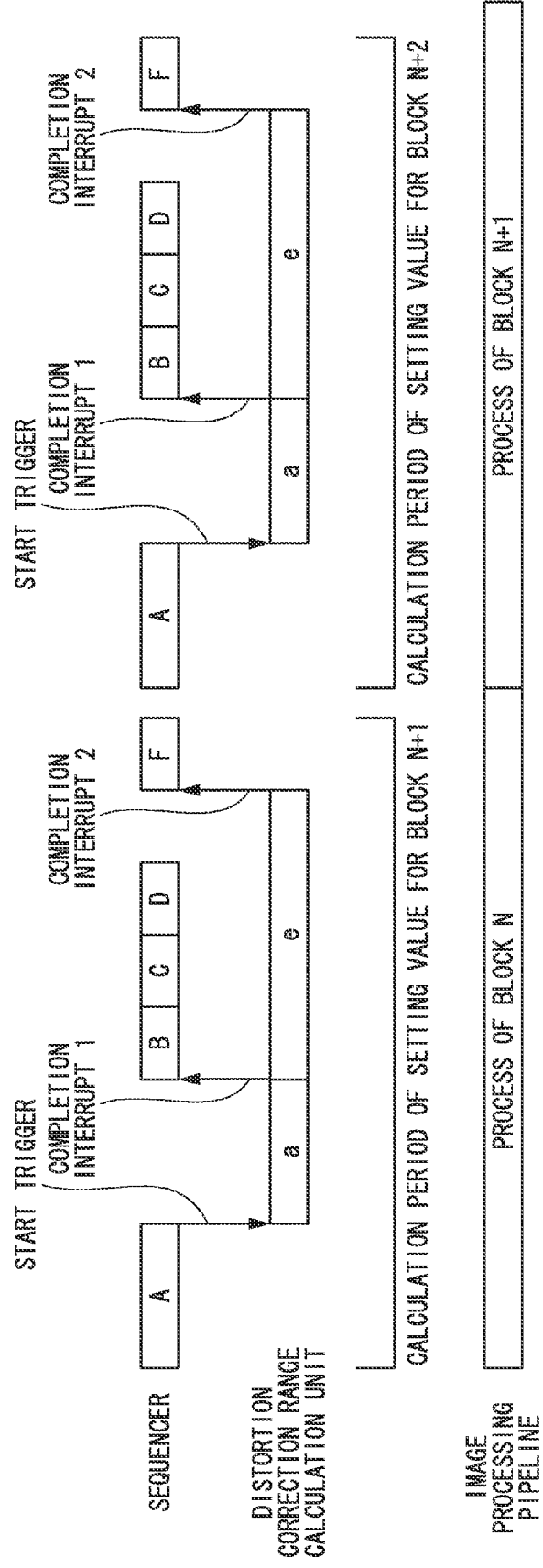

US 8,982,235 B2

IMAGE PROCESSING DEVICE AND IMAGE PROCESSING METHOD

BACKGROUND OF THE INVENTION

1. Field of the Invention

The present invention relates to an image processing device and an image processing method.

Priority is claimed on Japanese Patent Application No. 2011-230674, filed Oct. 20, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In an image processing device, which is included in an imaging apparatus such as a still image camera, a moving image camera, a medical endoscope camera, or an industrial endoscope camera, image processing is performed multiple times in order to generate one still image. Furthermore, as a processing method when performing each image processing, a method of dividing an image of one frame into rectangular blocks and performing each image processing in units of the divided blocks has been proposed (refer to Japanese Patent Publication No. 4179701, hereinafter referred to as Patent Document 1).

Meanwhile, it has been generally known that image data output from a solid-state imaging device such as an imager included in a camera includes distortion due to an optical system of a camera such as magnification chromatic aberration or distortion aberration. Therefore, an image processing device for performing image processing for correcting distortion of an optical system such as magnification chromatic aberration or distortion aberration has been proposed (refer to Japanese Unexamined Patent Application, First Publication No. 2005-44098, hereinafter referred to as Patent Document 2). The image processing device in the related art disclosed in Patent Document 2 collectively sets correction of the magnification chromatic aberration and correction of the distortion aberration as distortion correction, and simultaneously performs image processing using the same distortion correction processing unit.

FIG. 7 is a block diagram illustrating a schematic configuration of the image processing device in accordance with the related art disclosed in Patent Document 2. The image processing device in accordance with the related art illustrated in FIG. 7 has a pipeline in which each image processing necessary for generating one still image is directly interconnected. In more detail, the image processing device in the related art has a pipeline for performing image processing of respective blocks in sequence of a DRAM (Dynamic Random Access Memory), an input DMA (Direct Memory Access) unit, a YC (luminance color conversion) processing unit, an NR (noise removal) processing unit, a distortion correction processing unit, an output DMA unit, and the DRAM. In the image processing device in accordance with the related art illustrated in FIG. 7, the setting or operation of each image processing unit constituting the pipeline is controlled by a sequencer that controls all of the pipeline processing.

Each image processing is configured by the pipeline as illustrated in FIG. 7, resulting in the suppression of pressure to a bus band of the DRAM due to the image processing for generating one still image. Consequently, it is possible to perform the image processing for generating one still image in a short time, that is, to perform the processing at a high speed.

Meanwhile, when a distortion correction process is performed in units of blocks, image data in a range larger than a range (a block) of an image to be output needs to be input to a distortion correction processing unit. Moreover, the input range of the image data to be input to the distortion correction processing unit is changed based on blocks of an image to be processed for output. This is because the appearance of distortion due to an optical system of a camera is changed based on the positions of blocks obtained by dividing an image of one frame. In this regard, the image processing device in the related art disclosed in Patent Document 2 is included with a distortion correction range calculation unit for calculating in advance an input range of image data required when correcting distortion of blocks of an image to be output. That is, the image processing device in the related art disclosed in Patent Document 2 is configured to perform a calculation process of the input range of image data, which requires a lot of processing time, using a dedicated element.

Before the pipeline processing is started, the sequencer allows the distortion correction range calculation unit to calculate in advance the input range of image data, which is required when performing the distortion correction process, in each block to be output. The distortion correction range calculation unit calculates the input area of image data before the distortion correction process (that is, in a distorted state), which corresponds to the output range of image data to be output through the distortion correction process, and calculates a rectangular range, which is circumscribed about (surrounds) the calculated input area, as the input range of image data required in order to obtain the output range of image data to be output through the distortion correction process.

FIG. 8 is a block diagram illustrating a schematic configuration of the distortion correction range calculation unit included in the image processing device in accordance with the related art disclosed in Patent Document 2. As illustrated in FIG. 8, the distortion correction range calculation unit included in the image processing device in accordance with the related art includes a distortion correction coordinate conversion coefficient setting register, a distortion correction output range setting register, a distortion correction range calculation block, and a distortion correction input range result register. When the sequencer allows the distortion correction range calculation unit to calculate the input range of image data at the time of performing of a distortion correction process, the sequencer sets a distortion correction coordinate conversion coefficient and a distortion correction output range in the distortion correction range calculation unit, and allows the distortion correction range calculation unit to calculate the input range of image data.

The distortion correction range calculation block employs the distortion correction output range set by the sequencer as a block to be processed (the output range of image data to be output through a distortion correction process). Then, the distortion correction range calculation block calculates the positions (coordinates) of pixels in image data before performing the distortion correction process, which correspond to respective pixels included in image data in the distortion correction output range, based on the distortion correction coordinate conversion coefficient set by the sequencer, that is, the distortion correction range calculation block performs coordinate conversion. In this way, the input area (after the coordinate conversion) in a distorted state as illustrated in FIG. 7 is obtained. Then, the distortion correction range calculation block calculates a distortion correction input range, which is obtained by setting a rectangular range circumscribed about (surrounding) the input area obtained through the coordinate conversion as the input range of image data required in order to obtain the output range (the distortion correction output range) of image data to be output through the distortion correction process, and stores the calculated distortion correction input range in the distortion correction input range result register. Then, the distortion correction range calculation block outputs a completion interrupt to the sequencer, wherein the completion interrupt represents that the calculation of the input range of the image data has been completed.

If the completion interrupt representing that the calculation of the input range of the image data has been completed is received from the distortion correction range calculation unit, the sequencer starts the pipeline processing. When starting the pipeline processing, the sequencer performs setting required for each image processing unit constituting the pipeline, and then allows the operation of each image processing unit to be performed. At this time, the sequencer sets the distortion correction input range, which is stored in the distortion correction input range result register, in the distortion correction processing unit as the input range of the image data when performing the distortion correction process.

Meanwhile, it has been generally known that, when the magnification chromatic aberration correction is performed based on RAW data (Bayer data in FIG. 7) output from an imager, rather than based on three-plate image data (YCbCr data in FIG. 7) through a YC process or image data (YCbCr data in FIG. 7) subject to an NR process, it is possible to correct the magnification chromatic aberration more accurately, thereby generating a high quality image. The reason for this is that, in relation to the magnification chromatic aberration, since a shift amount of object light due to an optical system is changed based on colors (R, G, and B) of pixels included in the imager, it is not possible to accurately correct the shift amount of each color in three-plate image data in which the colors (R, G, and B) have been mixed.

In this regard, dividing the distortion correction process into magnification chromatic aberration correction and distortion aberration correction, which are then performed, while maintaining the same pipeline structure as the image processing device in the related art is considered. That is, configuring a pipeline for performing image processing of respective blocks in sequence of a DRAM, an input DMA unit, a magnification chromatic aberration correction processing unit, a YC processing unit, an NR processing unit, a distortion aberration correction processing unit, an output DMA unit, and the DRAM may be considered. The pipeline is configured as above so that it is possible to generate a high quality image.

However, when the magnification chromatic aberration correction is configured separately from the distortion aberration correction in one pipeline, the distortion correction range calculation unit included in the image processing device in accordance with the related art as illustrated in FIG. 8 may not accurately perform the calculation of input ranges suitable for the magnification chromatic aberration correction and the distortion aberration correction. This is because the YC process and the NR process are performed between a magnification chromatic aberration correction process and a distortion aberration correction process. In more detail, as illustrated in FIG. 8, the distortion correction range calculation unit included in the image processing device in accordance with the related art includes only one pair of the distortion correction coordinate conversion coefficient setting register and the distortion correction output range setting register, and only one distortion correction input range result register. Therefore, the distortion correction range calculation unit in the related art performs only a calculation process of one type of input range through the activation of a one-time calculation operation of an input range of image data. That is, the distortion correction range calculation unit in the related art performs only one calculation process of the calculation of the input range of image data for the magnification chromatic aberration correction and the calculation of the input range of image data for the distortion aberration correction through the activation of the one-time calculation operation of the input range of image data. Although the calculation of the input ranges of image data corresponding to the magnification chromatic aberration correction and the distortion aberration correction has been performed through the activation of the one-time calculation operation, input ranges with a margin, that is, ranges larger than input ranges suitable for the magnification chromatic aberration correction and the distortion aberration correction, may be calculated as input ranges in consideration of the YC process and the NR process which are performed between the magnification chromatic aberration correction process and the distortion aberration correction process.

Therefore, it is necessary for the distortion correction range calculation unit in the related art to perform a calculation operation of the input range of image data for the distortion aberration correction separately from a calculation operation of the input range of image data for the magnification chromatic aberration correction. However, in this case, loss time occurs in a processing time of the pipeline processing.

FIG. 9 is a timing chart illustrating timings when the distortion correction process in pipeline processing in the image processing device in accordance with the related art is divided into the magnification chromatic aberration correction process and the distortion aberration correction process and performed. In addition, the timing chart illustrated in FIG. 9 illustrates timings when the setting of the image processing units (the magnification chromatic aberration correction processing unit, the YC processing unit, the NR processing unit, and the distortion aberration correction processing unit) is performed in order to perform pipeline processing of a block N+1 while pipeline processing of a block N is being performed.

If the pipeline processing of the block N is started, the sequencer initially sets an output range of image data of a block to be output through the distortion aberration correction process as a distortion correction output range, further sets a distortion correction coordinate conversion coefficient corresponding to the distortion aberration correction process, and allows the distortion correction range calculation unit in the related art to perform the calculation operation of the input range of image data for the distortion aberration correction in a process A. Thereby, the distortion correction range calculation unit in the related art performs the calculation operation a of the input range of the image data for the distortion aberration correction. Then, if the calculation operation a of the input range of the image data for the distortion aberration correction is completed, the distortion correction range calculation unit in the related art outputs a completion interrupt to the sequencer, wherein the completion interrupt represents that the calculation of the input range of the image data has been completed.

If the completion interrupt representing that the calculation of the input range of the image data has been completed is received from the distortion correction range calculation unit, the sequencer sets the input range (a distortion correction input range) of the image data for the distortion aberration correction calculated by the distortion correction range calculation unit in the distortion aberration correction unit in a process B.

Then, in a process C, the sequencer calculates the input range of image data required for the NR processing unit based on the distortion correction input range calculated by the distortion correction range calculation unit, and performs setting required for the NR processing unit based on the calculated input range of the image data. Then, in a process D, the sequencer calculates the input range of image data required for the YC processing unit based on the calculated input range of the image data required for the NR processing unit, and performs setting required for the YC processing unit based on the calculated input range of the image data.

Then, in a process E, the sequencer sets the calculated input range of the image data required for the YC processing unit to the distortion correction output range as the output range of the image data of the block to be output through the magnification chromatic aberration correction process, further sets a distortion correction coordinate conversion coefficient corresponding to the magnification chromatic aberration correction process, and allows the distortion correction range calculation unit in the related art to perform the calculation operation of the input range of image data for the magnification chromatic aberration correction. Thereby, the distortion correction range calculation unit in the related art performs a calculation operation e of the input range of the image data for the magnification chromatic aberration correction. Then, if the calculation operation e of the input range of the image data for the magnification chromatic aberration correction is completed, the distortion correction range calculation unit in the related art outputs a completion interrupt to the sequencer, wherein the completion interrupt represents that the calculation of the input range of the image data has been completed.

If the completion interrupt representing that the calculation of the input range of the image data has been completed is received from the distortion correction range calculation unit, the sequencer sets, in a magnification chromatic aberration correction unit, the input range (a distortion correction input range) of the image data for the magnification chromatic aberration correction calculated by the distortion correction range calculation unit in a process F. Consequently, it is possible to start the pipeline processing of the next block N+1.

In this way, the sequencer performs in advance the calculation and setting operations of the input range of image data when performing the pipeline processing of the next block N+1. Then, the sequencer performs an operation for performing the pipeline processing of a next block N+2 in the same manner.

However, as apparent from FIG. 9, while the distortion correction range calculation unit is performing the calculation operation of the input range of image data, since the sequencer waits for the calculation result of the distortion correction range calculation unit, the sequencer performs no operations, resulting in a delay of a timing at which the sequencer performs setting required for the NR processing unit or setting required for the YC processing unit.

As described above, the process in which the distortion correction range calculation unit calculates the input range of image data required for the distortion correction process is a process requiring much time. Therefore, while performing pipeline processing of a block which is currently processed, the calculation of the input range of image data required for each image processing unit for performing the pipeline processing of the next block or the setting required for each image processing unit based on the calculated input range of the image data is likely not to be completed by the sequencer.

That is, as illustrated in FIG. 9, the calculation period of the input range of image data of a block (the block N+1) which is to be processed next is likely to be longer than the period of the pipeline processing of a block (the block N) which is currently processed. If the calculation period of the input range of the image data of the block which is to be processed next is longer than the period of the pipeline processing of the block which is currently processed, that is, if the process of the sequencer is not completed while the pipeline processing of the block currently processed is being performed, loss time in processing time may occur between the pipeline processing of the block N and the pipeline processing of the block N+1 as illustrated in FIG. 9. In addition, the processing time to be lost is considered to be increased as a block is subdivided.

In this regard, a configuration in which the magnification chromatic aberration correction process is separated from the pipeline, and the pipeline processing including the distortion aberration correction is performed after the magnification chromatic aberration correction process of the RAW data (the Bayer data) output from the imager is performed has been considered. In this case, the Bayer data stored in the DRAM is first read, and subject to the magnification chromatic aberration correction process, and then the Bayer data after the magnification chromatic aberration correction process is written (stored) in the DRAM again. Thereafter, the Bayer data after the magnification chromatic aberration correction process stored in the DRAM is read, and subject to the image processing (the pipeline processing) including the distortion aberration correction, and then image data (YCbCr data) after the image processing including the distortion aberration correction is written (stored) in the DRAM. With such a configuration, there is considered to be no problem regarding the calculation operation of the input range of image data by the distortion correction range calculation unit as described above, that is, the problem regarding the loss time in processing time which is caused by the relation between the calculation period of the input range of image data of the block which is to be processed next and the period of the pipeline processing of the block which is currently processed.

However, in this case, the image processing for generating one still image is performed through two pipeline processing. In more detail, one still image is generated through the two pipeline processing, that is, the pipeline processing in sequence of the DRAM, the input DMA unit, the magnification chromatic aberration correction processing unit, the output DMA unit, and the DRAM, and the pipeline processing in sequence of the DRAM, the input DMA unit, the YC processing unit, the NR processing unit, the distortion aberration correction processing unit, the output DMA unit, and the DRAM. Therefore, the number of accesses to the DRAM regarding the image processing is increased twice, resulting in an increase of pressure to the bus band of the DRAM required for the image processing. Moreover, loss time in processing time is also likely to occur between the two pipeline processing.

SUMMARY

The present invention provides an image processing device included with a distortion correction range calculation unit capable of accurately calculating input ranges suitable for magnification chromatic aberration correction and distortion aberration correction through one-time activation even though the magnification chromatic aberration correction is configured in one pipeline separately from distortion aberration correction, and an image processing method.

An image processing device may include: an image processing pipeline in which at least a magnification chromatic aberration correction processing unit that corrects magnification chromatic aberration of an imaging optical system, a distortion aberration correction processing unit that corrects distortion aberration of the imaging optical system, and an imaging processing unit that performs image processing with respect to image data and outputs image processed-image data to the distortion aberration correction processing unit are included in one pipeline, magnification chromatic aberration of the image data having been corrected by the magnification chromatic aberration correction processing unit; a sequencer that controls operations of respective elements included in the image processing pipeline; and a distortion correction range calculation unit that calculates a distortion aberration correction input range, which represents an input range of the image processed-image data input to the distortion aberration correction processing unit, based on a preset distortion aberration correction output range representing an output range of distortion aberration-corrected image data output from the distortion aberration correction processing unit, and a preset distortion aberration correction coordinate conversion coefficient for converting coordinates representing a position of each pixel included in the distortion aberration correction output range to coordinates representing a position of each pixel before the distortion aberration is corrected, and further calculates a magnification chromatic aberration correction input range, which represents an input range of image data input to the magnification chromatic aberration correction processing unit, based on the calculated distortion aberration correction input range, a preset image processing margin determined based on characteristics of the image processing unit, and a preset magnification chromatic aberration correction coordinate conversion coefficient for converting coordinates representing a position of each pixel included in an output range of magnification chromatic aberration-corrected image data output from the magnification chromatic aberration correction processing unit to coordinates representing a position of each pixel before the magnification chromatic aberration is corrected.

The distortion correction range calculation unit may continuously perform calculation of the distortion aberration correction input range and calculation of the magnification chromatic aberration correction input range in response to one-time calculation operation start control from the sequencer, and sequentially output an interrupt signal representing that the calculation of the distortion aberration correction input range has been completed, and an interrupt signal representing that the calculation of the magnification chromatic aberration correction input range has been completed to the sequencer, whenever the calculation of the distortion aberration correction input range or the calculation of the magnification chromatic aberration correction input range is completed.

The distortion correction range calculation unit may include: a coordinate conversion unit that calculates an input range of image data based on an output range of the image data and a coordinate conversion coefficient for converting coordinates representing a position of each pixel included in the output range; a distortion aberration correction input range holding unit that holds the input range of the image data calculated by the coordinate conversion unit as the distortion aberration correction input range; a coordinate conversion coefficient selection unit that selects one of the distortion aberration correction coordinate conversion coefficient and the magnification chromatic aberration correction coordinate conversion coefficient; a range expansion unit that expands the distortion aberration correction input range held in the distortion aberration correction input range holding unit based on the image processing margin, thereby calculating a magnification chromatic aberration correction output range representing the output range of the magnification chromatic aberration-corrected image data output from the magnification chromatic aberration correction processing unit; and an output range selection unit that selects one of the distortion aberration correction output range and the magnification chromatic aberration correction output range calculated by the range expansion unit. When calculating the distortion aberration correction input range, the coordinate conversion coefficient selection unit selects the distortion aberration correction coordinate conversion coefficient and outputs the selected distortion aberration correction coordinate conversion coefficient to the coordinate conversion unit as the coordinate conversion coefficient, the output range selection unit may select the distortion aberration correction output range and output the selected distortion aberration correction output range to the coordinate conversion unit as the output range of the image data, and the coordinate conversion unit may calculate the distortion aberration correction input range based on the input distortion aberration correction output range and distortion aberration correction coordinate conversion coefficient, and output the calculated distortion aberration correction input range to the distortion aberration correction input range holding unit. When calculating the magnification chromatic aberration correction input range, the coordinate conversion coefficient selection unit may select the magnification chromatic aberration correction coordinate conversion coefficient and output the selected magnification chromatic aberration correction coordinate conversion coefficient to the coordinate conversion unit as the coordinate conversion coefficient, the output range selection unit may select the magnification chromatic aberration correction output range and output the selected magnification chromatic aberration correction output range to the coordinate conversion unit as the output range of the image data, and the coordinate conversion unit may calculate the magnification chromatic aberration correction input range based on the input magnification chromatic aberration correction output range and magnification chromatic aberration correction coordinate conversion coefficient.

In the image processing pipeline, the image processing margin may correspond to a difference between the input range of the image data input to the image processing unit positioned between the magnification chromatic aberration correction processing unit and the distortion aberration correction processing unit and the output range of the image processed-image data output through the image processing of the image processing unit.

The difference between the input range of the image data input to the image processing unit and the output range of the image processed-image data output from the image processing unit may correspond to the number of image data to be lost by the image processing performed by the image processing unit.

The number of image data may be calculated based on characteristics of a filter included in the image processing unit.

An image processing method of an image processing device, which includes an image processing pipeline in which at least a magnification chromatic aberration correction processing unit that corrects magnification chromatic aberration of an imaging optical system, a distortion aberration correction processing unit that corrects distortion aberration of the imaging optical system, and an imaging processing unit that performs image processing with respect to image data and outputs image processed-image data to the distortion aberration correction processing unit are included in one pipeline, magnification chromatic aberration of the image data having been corrected by the magnification chromatic aberration correction processing unit, a sequencer that controls operations of respective elements included in the image processing pipeline, and a distortion correction range calculation unit that calculates a distortion aberration correction input range, which represents an input range of the image processed-image data input to the distortion aberration correction processing unit, based on a preset distortion aberration correction output range and a preset distortion aberration correction coordinate conversion coefficient, and further calculates a magnification chromatic aberration correction input range, which represents an input range of image data input to the magnification chromatic aberration correction processing unit, based on the calculated distortion aberration correction input range, a preset image processing margin, and a preset magnification chromatic aberration correction coordinate conversion coefficient. The sequencer may performs: a step of setting in advance, in the distortion correction range calculation unit, the distortion aberration correction output range representing an output range of distortion aberration-corrected image data output from the distortion aberration correction processing unit, the distortion aberration correction coordinate conversion coefficient for converting coordinates representing a position of each pixel included in the distortion aberration correction output range to coordinates representing a position of each pixel before distortion aberration is corrected, the image processing margin determined based on characteristics of the image processing unit, and the magnification chromatic aberration correction coordinate conversion coefficient for converting coordinates representing a position of each pixel included in an output range of magnification chromatic aberration-corrected image data output from the magnification chromatic aberration correction processing unit to coordinates representing a position of each pixel before magnification chromatic aberration is corrected; a step of outputting one-time calculation operation start control, and continuously allowing the distortion correction range calculation unit to perform calculation of the distortion aberration correction input range and the magnification chromatic aberration correction processing unit to perform calculation of the magnification chromatic aberration correction input range; a step of acquiring the calculated distortion aberration correction input range when an interrupt signal representing that the calculation of the distortion aberration correction input range has been completed is received from the distortion correction range calculation unit; and a step of acquiring the calculated magnification chromatic aberration correction input range when an interrupt signal representing that the calculation of the magnification chromatic aberration correction input range has been completed is received from the distortion correction range calculation unit.

According to the preferred embodiment of the present invention, it is possible to accurately calculate input ranges suitable for magnification chromatic aberration correction and distortion aberration correction through one-time activation even though the magnification chromatic aberration correction is configured in one pipeline separately from distortion aberration correction.

BRIEF DESCRIPTION OF THE DRAWINGS

The above features and advantages of the present invention will be more apparent from the following description of certain preferred embodiments taken in conjunction with the accompanying drawings, in which:

FIG. 6 is a timing chart illustrating timings of a pipeline processing of the image processing device in accordance with the first preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
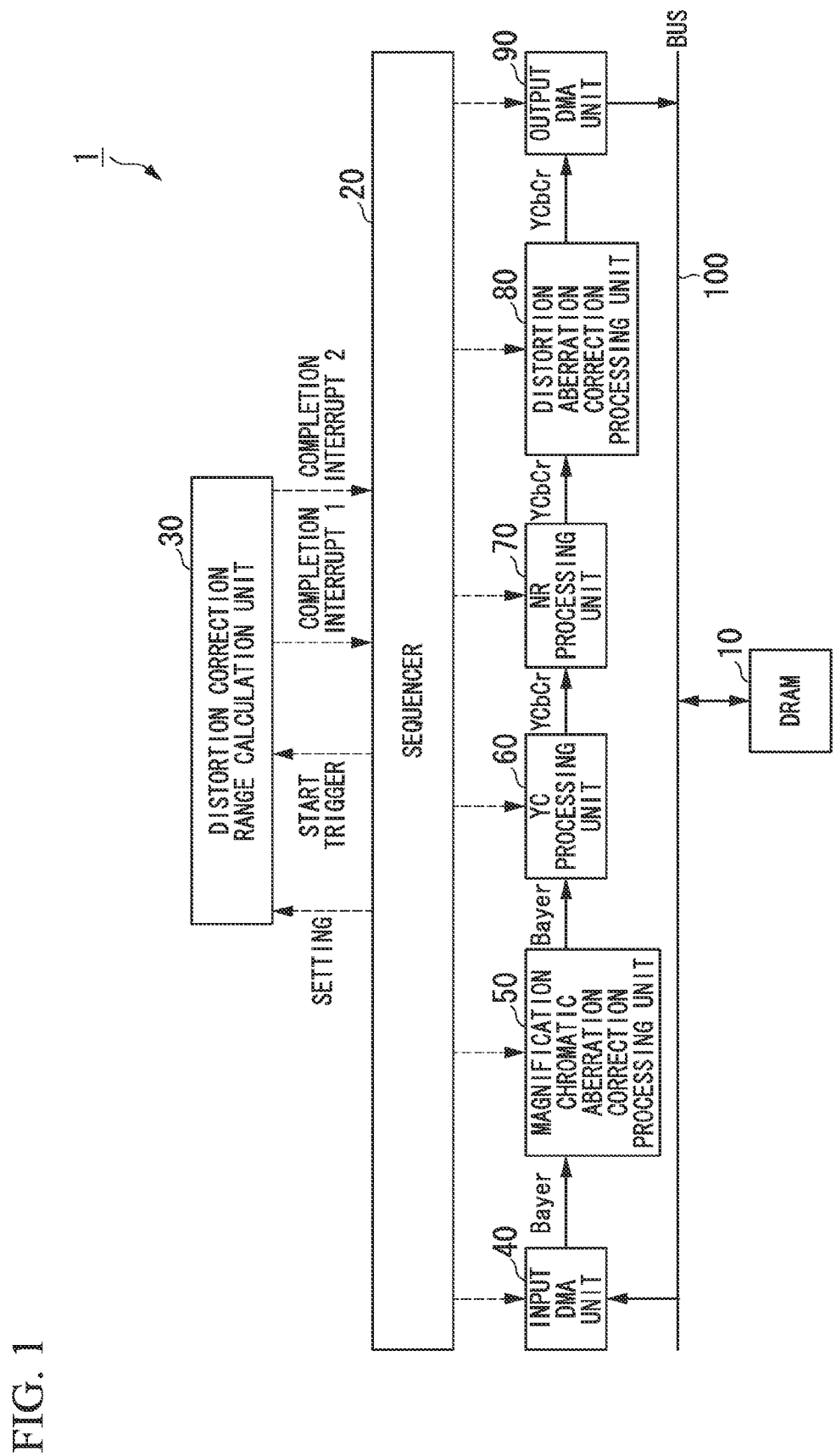
FIG. 1 is a block diagram illustrating a schematic configuration of an image processing device in accordance with a first preferred embodiment of the present invention.

FIG. 1 is a block diagram illustrating a schematic configuration of an image processing device in accordance with the first preferred embodiment of the present invention. An image processing device 1 in accordance with the first preferred embodiment of the present invention illustrated in FIG. 1 includes a DRAM 10, a sequencer 20, a distortion correction range calculation unit 30, an input DMA unit 40, a magnification chromatic aberration correction processing unit 50, a YC processing unit 60, a NR processing unit 70, a distortion aberration correction processing unit 80, an output DMA unit 90, and a bus 100. The image processing device 1 in accordance with the first preferred embodiment of the present invention, for example, is included in an imaging apparatus such as a still image camera.

As illustrated in FIG. 1, image processing in the image processing device 1 in accordance with the first preferred embodiment of the present invention is sequentially performed in respective elements through a process of a pipeline through which the input DMA unit 40, the magnification chromatic aberration correction processing unit 50, the YC processing unit 60, the NR processing unit 70, the distortion aberration correction processing unit 80, and the output DMA unit 90 are directly connected in series. As apparent from FIG. 1, in the pipeline processing by the image processing device 1, magnification chromatic aberration correction is performed separately from distortion aberration correction in one pipeline, that is, a pipeline of one bus.

The DRAM 10 is connected to the bus 100 to store various types of data processed in an imaging apparatus. For example, the DRAM 10 stores image data (hereinafter, also referred to as "Bayer data") of a still image output from an imager (not illustrated) included in the imaging apparatus. The image processing device 1 in accordance with the first preferred embodiment of the present invention divides the Bayer data of one frame stored in the DRAM 10 into a plurality of rectangular blocks, and performs image processing using respective elements in units of the divided blocks.

When performing the pipeline processing of the image processing device 1 in accordance with the first preferred embodiment of the present invention, the sequencer 20 controls a process sequence of each element constituting the pipeline. The sequencer 20 outputs a control signal to each element to control setting and processing start corresponding to a block that performs the pipeline processing. Before the pipeline processing of the image processing device 1 is started, the sequencer 20 calculates an input range of block image data before image processing, which corresponds to an output range of image data (hereinafter referred to as the "block image data") of a block to be output through image processing of the respective elements. In addition, the sequencer 20 allows the distortion correction range calculation unit 30 to calculate the input range of the block image data before the image processing (distortion correction), which is set in the magnification chromatic aberration correction processing unit 50 and the distortion aberration correction processing unit 80. The sequencer 20 sets an input range of block image data of a block for performing a process, which has been calculated by the sequencer 20 itself or the distortion correction range calculation unit 30, in each element, and then allows each element to start a process.

The distortion correction range calculation unit 30 calculates an input range of block image data before a distortion correction process, which corresponds to an output range of block image data to be output after the distortion correction process, based on the setting and the control signal of the sequencer 20. The distortion correction range calculation unit 30 calculates an input range of block image data before a distortion aberration correction process by the distortion aberration correction processing unit 80, and an input range of block image data before a magnification chromatic aberration correction process by the magnification chromatic aberration correction processing unit 50. The distortion correction range calculation unit 30 continuously performs the calculation of the input range of the block image data before the distortion aberration correction process by the distortion aberration correction processing unit 80, and the calculation of the input range of the block image data before the magnification chromatic aberration correction process by the magnification chromatic aberration correction processing unit 50 based on one-time processing start control (one-time start trigger input) by the sequencer 20. Furthermore, whenever the calculation of the input ranges of the block image data is completed by the distortion aberration correction processing unit 80 and the magnification chromatic aberration correction processing unit 50, the distortion correction range calculation unit 30 sequentially outputs completion interrupts (a first completion interrupt and a second completion interrupt) to the sequencer 20, wherein each completion interrupt represents that the calculation of the input range of the block image data has been completed. In addition, the configuration and operation of the distortion correction range calculation unit 30 will be described later.

The input DMA unit 40 is an element of the pipeline for reading block image data (hereinafter referred to as "block Bayer data") stored in the DRAM 10, and outputting the block image data to the magnification chromatic aberration correction processing unit 50 which is the next element of the pipeline. The input DMA unit 40 reads the block Bayer data from the DRAM 10 through the bus 100 in response to the control signal input from the sequencer 20, and outputs the read block Bayer data to the magnification chromatic aberration correction processing unit 50.

The magnification chromatic aberration correction processing unit 50 is an element of the pipeline for correcting magnification chromatic aberration of the input block image data (the block Bayer data). In response to the control signal input from the sequencer 20, the magnification chromatic aberration correction processing unit 50 generates block Bayer data, which is obtained by correcting the magnification chromatic aberration of the block Bayer data, and outputs the generated block Bayer data after the magnification chromatic aberration correction to the YC processing unit 60.

The YC processing unit 60 is an element of the pipeline for performing various digital image processing with respect to the input block image data (block Bayer data) after the magnification chromatic aberration correction, thereby generating Y (luminance) data and C (color) data. In response to the control signal input from the sequencer 20, the YC processing unit 60 generates the Y data and the C data (hereinafter, also collectively referred to as "block YCbCr data") corresponding to the block Bayer data input from the magnification chromatic aberration correction processing unit 50, and outputs the generated block YCbCr data to the NR processing unit 70.

The NR processing unit 70 is an element of the pipeline for performing various digital image processing with respect to the input block image data (block YCbCr data), thereby reducing noise included in the block YCbCr data. In response to the control signal input from the sequencer 20, the NR processing unit 70 reduces noise included in the block YCbCr data input from the YC processing unit 60, and outputs the block YCbCr data with reduced noise to the distortion aberration correction processing unit 80.

The distortion aberration correction processing unit 80 is an element of the pipeline for correcting distortion aberration of the input block image data (input block YCbCr data) with reduced noise. In response to the control signal input from the sequencer 20, the distortion aberration correction processing unit 80 generates block YCbCr data, which is obtained by correcting the distortion aberration of the block YCbCr data with reduced noise, and outputs the generated block YCbCr data after the distortion aberration correction to the output DMA unit 90.

The output DMA unit 90 is an element of the pipeline for writing (storing) the input block image data (block YCbCr data) after the distortion aberration correction in the DRAM 10. In response to the control signal input from the sequencer 20, the output DMA unit 90 outputs the block YCbCr data after the distortion aberration correction, which is input from the distortion aberration correction processing unit 80, to the DRAM 10 through the bus 100.

In this way, the elements of the image processing device 1 sequentially perform the image processing based on the control signal output from the sequencer 20 in the blocks divided from the Bayer data of one frame, thereby performing a series of image processing for the Bayer data of the blocks.

Figure 2:
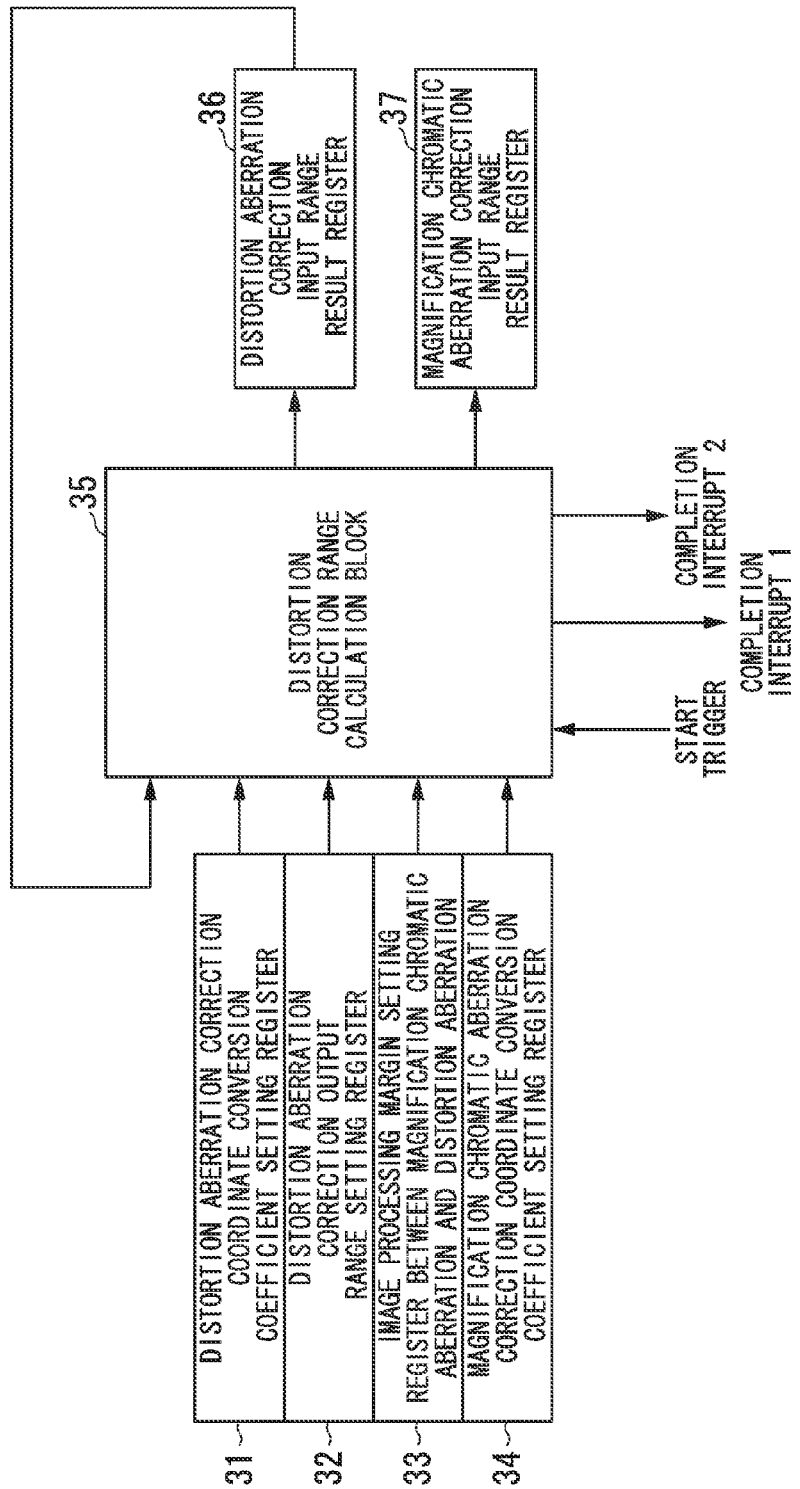
FIG. 2 is a block diagram illustrating a basic configuration of a distortion correction range calculation unit included in the image processing device in accordance with the first preferred embodiment of the present invention.

Next, the distortion correction range calculation unit 30 will be described. FIG. 2 is a block diagram illustrating a basic configuration of the distortion correction range calculation unit 30 included in the image processing device 1 in accordance with the first preferred embodiment of the present invention. As illustrated in FIG. 2, the distortion correction range calculation unit 30 includes a distortion aberration correction coordinate conversion coefficient setting register 31, a distortion aberration correction output range setting register 32, an image processing margin setting register 33 between magnification chromatic aberration and distortion aberration, a magnification chromatic aberration correction coordinate conversion coefficient setting register 34, a distortion correction range calculation block 35, a distortion aberration correction input range result register 36, and a magnification chromatic aberration correction input range result register 37.

When the sequencer 20 allows the distortion correction range calculation unit 30 to perform the calculation of the input ranges of block image data of the distortion aberration correction processing unit 80 and the magnification chromatic aberration correction processing unit 50, the sequencer 20 performs setting required for the distortion aberration correction coordinate conversion coefficient setting register 31, the distortion aberration correction output range setting register 32, the image processing margin setting register 33 between magnification chromatic aberration and distortion aberration, and the magnification chromatic aberration correction coordinate conversion coefficient setting register 34, and allows the distortion correction range calculation unit 30 to start the calculation of the input ranges of the block image data.

The sequencer 20 sets the range of the block image data (the block YCbCr data) after the distortion aberration correction, which is output from the distortion aberration correction processing unit 80, in the distortion aberration correction output range setting register 32 as a distortion aberration correction output range.

The sequencer 20 sets a distortion aberration correction coordinate conversion coefficient, which approximately represents a distance from the center of an optical system in each pixel in the block image data (the block YCbCr data), in the distortion aberration correction coordinate conversion coefficient setting register 31 in order to perform coordinate conversion on the position of each pixel in the block image data (the block YCbCr data) with reduced noise which is output from the NR processing unit 70. In more detail, the sequencer 20 sets, as the distortion aberration correction coordinate conversion coefficient, a coefficient for converting the position (the coordinates) of each pixel included in the output range of the block YCbCr data after the distortion aberration correction, which has been set in the distortion aberration correction output range setting register 32, to the position (the coordinates) of a pixel in a range of the block YCbCr data in a distorted state before the distortion aberration correction.

The sequencer 20 sets the number of block image data (block YCbCr data) to be lost by the image processing (the image processing performed by the YC processing unit 60 and the NR processing unit 70 in accordance with the first preferred embodiment of the present invention) performed between the magnification chromatic aberration correction processing unit 50 and the distortion aberration correction processing unit 80 in the image processing margin setting register 33 between magnification chromatic aberration and distortion aberration as an image processing margin between magnification chromatic aberration and distortion aberration. That is, the sequencer 20 sets a difference between the range of the block YCbCr data before the distortion aberration correction, which is input to the distortion aberration correction processing unit 80, and the range of block Bayer data after the magnification chromatic aberration correction, which is output from the magnification chromatic aberration correction processing unit 50, as the image processing margin between magnification chromatic aberration and distortion aberration.

The value of the image processing margin between magnification chromatic aberration and distortion aberration is a value based on the characteristics of the image processing (the image processing performed by the YC processing unit 60 and the NR processing unit 70 in accordance with the first preferred embodiment of the present invention) performed between the magnification chromatic aberration correction processing unit 50 and the distortion aberration correction processing unit 80. For example, the value of the image processing margin between magnification chromatic aberration and distortion aberration is calculated based on filter sizes of the YC processing unit 60 and the NR processing unit 70 performed between the magnification chromatic aberration correction processing unit 50 and the distortion aberration correction processing unit 80. In this case, for example, when the filter size of the YC processing unit 60 is 7×7 and the filter size of the NR processing unit 70 is 33×33, the value of the image processing margin between magnification chromatic aberration and distortion aberration is 38 ($=(7-1)+(33-1)$). This value is equal to the number of data which is lost by the filters of the YC processing unit 60 and the NR processing unit 70.

The sequencer 20 sets a magnification chromatic aberration correction coordinate conversion coefficient, which approximately represents a distance from the center of the optical system in each pixel in the block image data (the block Bayer data), in the magnification chromatic aberration correction coordinate conversion coefficient setting register 34 in order to perform coordinate conversion on the position of each pixel in the input block image data (the input block Bayer data). In more detail, the sequencer 20 sets, as the magnification chromatic aberration correction coordinate conversion coefficient, a coefficient for converting the position (the coordinates) of each pixel included in the input range of the block YCbCr data before the distortion aberration correction, which is input to the distortion aberration correction processing unit 80, to the position (the coordinates) of a pixel in a range of block Bayer data in a distorted state before the magnification chromatic aberration correction. This is because the magnification chromatic aberration correction by the magnification chromatic aberration correction processing unit 50 is a distortion correction process performed earlier than the distortion aberration correction by the distortion aberration correction processing unit 80.

The distortion correction range calculation block 35 initially calculates the input range of the block image data (the block YCbCr data) before the distortion aberration correction process by the distortion aberration correction processing unit 80 as a distortion aberration correction input range based on the distortion aberration correction coordinate conversion coefficient and the distortion aberration correction output range in response to the processing start control signal (the start trigger) input from the sequencer 20. Next, the distortion correction range calculation block 35 outputs a completion interrupt 1 to the sequencer 20, wherein the completion interrupt 1 represents that the calculation of the distortion aberration correction input range has been completed.

Then, the distortion correction range calculation block 35 calculates the input range of the block image data (the block Bayer data) before the magnification chromatic aberration correction process by the magnification chromatic aberration correction processing unit 50 as a magnification chromatic aberration correction input range based on the calculated distortion aberration correction input range, the image processing margin between magnification chromatic aberration and distortion aberration, and the magnification chromatic aberration correction coordinate conversion coefficient. Then, the distortion correction range calculation block 35 outputs a completion interrupt 2 to the sequencer 20, wherein the completion interrupt 2 represents that the calculation of the magnification chromatic aberration correction input range has been completed.

In this way, the distortion correction range calculation block 35 initially calculates the distortion aberration correction input range, and then calculates the magnification chromatic aberration correction input range by employing the distortion aberration correction input range, which has been calculated by the distortion correction range calculation block 35 itself, as the output range of the magnification chromatic aberration correction.

The distortion aberration correction input range result register 36 holds the distortion aberration correction input range, which has been calculated by the distortion correction range calculation block 35, as a result of the distortion aberration correction input range calculated by the distortion correction range calculation unit 30.

The magnification chromatic aberration correction input range result register 37 holds the magnification chromatic aberration correction input range, which has been calculated by the distortion correction range calculation block 35, as a result of the magnification chromatic aberration correction input range calculated by the distortion correction range calculation unit 30.

With such a configuration, it is possible for the distortion correction range calculation unit 30 to automatically and continuously perform the calculation of the distortion aberration correction input range and the calculation of the magnification chromatic aberration correction input range in response to a one-time start trigger input from the sequencer 20.

Figure 3:
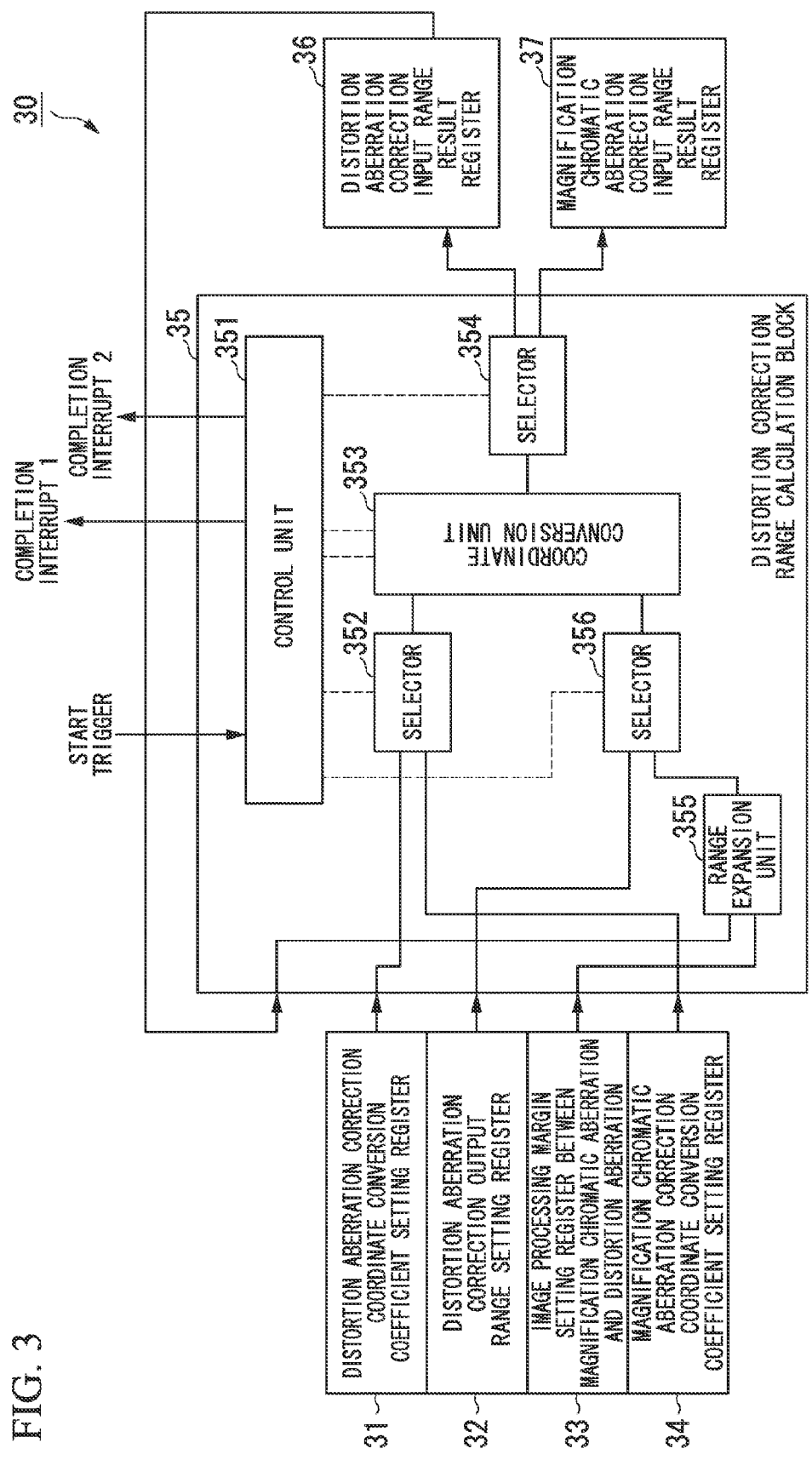
FIG. 3 is a block diagram illustrating a schematic configuration of the distortion correction range calculation unit included in the image processing device in accordance with the first preferred embodiment of the present invention.

Next, the distortion correction range calculation unit 30 will be described in more detail. FIG. 3 is a block diagram illustrating a schematic configuration of the distortion correction range calculation unit 30 included in the image processing device 1 in accordance with the first preferred embodiment of the present invention. As illustrated in FIG. 3, the distortion correction range calculation unit 30 includes a control unit 351, a selector 352, a coordinate conversion unit 353, a selector 354, a range expansion unit 355, and a selector 356 as the distortion correction range calculation block 35.

The control unit 351 controls all of the calculation of the distortion aberration correction input range or the calculation of the magnification chromatic aberration correction input range by the distortion correction range calculation block 35. In response to the start trigger input from the sequencer 20, the control unit 351 outputs a control signal for performing the calculation of the distortion aberration correction input range or the calculation of the magnification chromatic aberration correction input range to each element of the distortion correction range calculation block 35. Furthermore, the control unit 351 outputs a completion interrupt, which is input from the coordinate conversion unit 353, to the sequencer 20 as the completion interrupt 1 or the completion interrupt 2, wherein the completion interrupt 1 represents that the calculation of the distortion aberration correction input range has been completed, and the completion interrupt 2 represents that the calculation of the magnification chromatic aberration correction input range has been completed. In addition, the control of the distortion correction range calculation block 35 by the control unit 351 will be described later.

The selector 352 selects one coordinate conversion coefficient of the distortion aberration correction coordinate conversion coefficient set in the distortion aberration correction coordinate conversion coefficient setting register 31 and the magnification chromatic aberration correction coordinate conversion coefficient set in the magnification chromatic aberration correction coordinate conversion coefficient setting register 34 in response to the control signal input from the control unit 351, and outputs the selected coordinate conversion coefficient to the coordinate conversion unit 353.

The coordinate conversion unit 353 calculates a distortion correction input range based on the coordinate conversion coefficient input from the selector 352 and a distortion correction output range input from the selector 356, and outputs the calculated distortion correction input range to the selector 354. In more detail, the coordinate conversion unit 353 employs the distortion correction output range input from the selector 356 as an output range of block image data to be output, and calculates the position (the coordinates) of each pixel in the block image data before the distortion correction process, which corresponds to each pixel included in the block image data in the distortion correction output range, that is, performs coordinate conversion based on the coordinate conversion coefficient input from the selector 352. In this way, an input area of block image data in a distorted state is obtained. Then, the coordinate conversion unit 353 calculates a rectangular range, which is circumscribed about (surrounds) the input area obtained by the coordinate conversion, as the distortion correction input range, and outputs the calculated distortion correction input range to the selector 354. Furthermore, the coordinate conversion unit 353 outputs a completion interrupt to the control unit 351, wherein the completion interrupt represents that the calculation of the distortion correction input range has been completed.

In response to the control signal input from the control unit 351, the selector 354 outputs the distortion correction input range, which is input from the coordinate conversion unit 353, to one input range result register of the distortion aberration correction input range result register 36 and the magnification chromatic aberration correction input range result register 37 as a calculation result of the distortion aberration correction input range or the magnification chromatic aberration correction input range calculated by the distortion correction range calculation block 35.

The range expansion unit 355 adds the image processing margin between magnification chromatic aberration and distortion aberration, which has been set in the image processing margin setting register 33 between magnification chromatic aberration and distortion aberration, to the distortion aberration correction input range held in the distortion aberration correction input range result register 36, thereby calculating the distortion correction output range. That is, after the result of the distortion aberration correction input range is obtained, the range expansion unit 355 performs calculation equal to the calculation of the input range of image data, which is required for the NR processing unit 70 and the YC processing unit 60 and is performed by the sequencer 20 itself, through the addition of the image processing margin between magnification chromatic aberration and distortion aberration set in the image processing margin setting register 33 between magnification chromatic aberration and distortion aberration.

Thus, the distortion correction output range calculated by the range expansion unit 355 is a range (hereinafter referred to as a "magnification chromatic aberration correction output range") of the block image data (the block Bayer data) after the magnification chromatic aberration correction, which is output from the magnification chromatic aberration correction processing unit 50.

In response to the control signal input from the control unit 351, the selector 356 selects one distortion correction output range of the distortion aberration correction output range set in the distortion aberration correction output range setting register 32 and the magnification chromatic aberration correction output range calculated by the range expansion unit 355, and outputs the selected distortion correction output range to the coordinate conversion unit 353.

Figure 4:
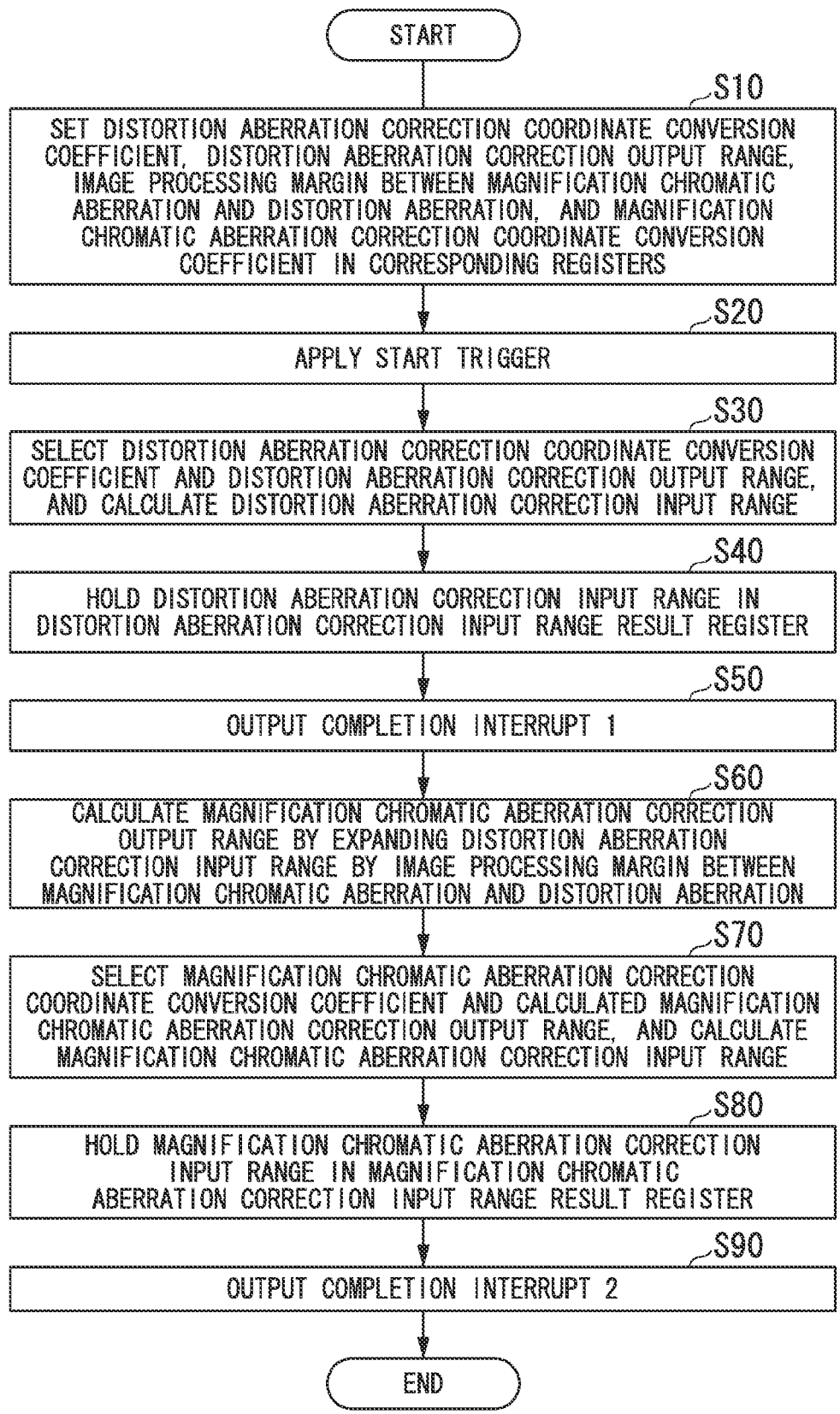
FIG. 4 is a flowchart illustrating a procedure of a calculation process of an input range by the distortion correction range calculation unit included in the image processing device in accordance with the first preferred embodiment of the present invention.
Figure 5A:
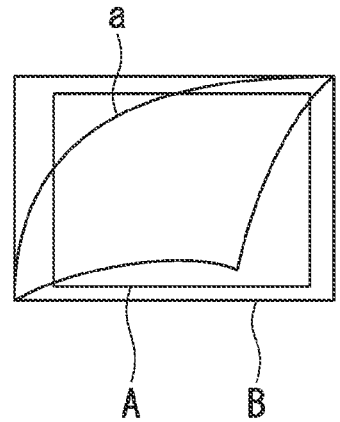
FIGS. 5A, 5B and 5C are diagrams schematically illustrating an example of an operation of the calculation process of the input range by the distortion correction range calculation unit included in the image processing device in accordance with the first preferred embodiment of the present invention.
Figure 5B:
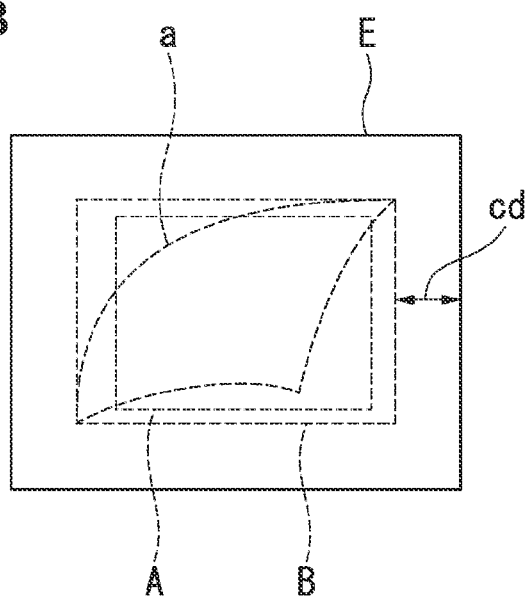
Figure 5C:
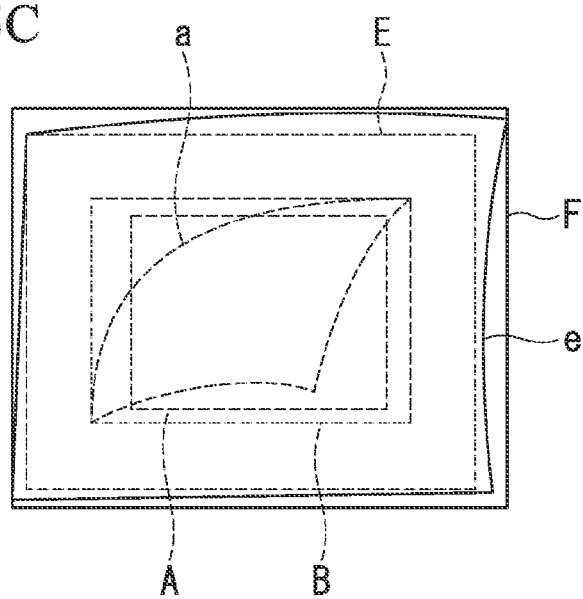
Figure 7:
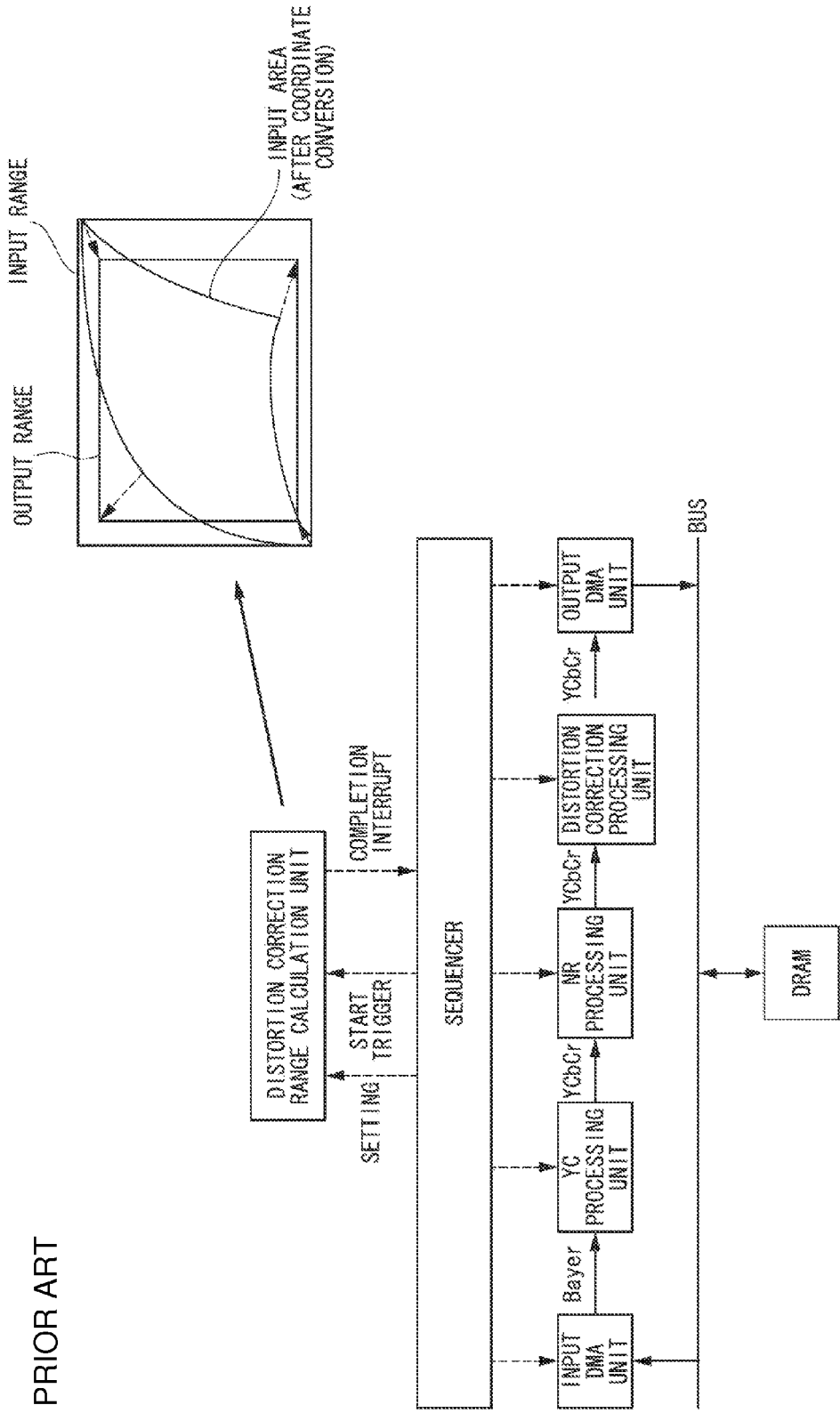
FIG. 7 is a block diagram illustrating a schematic configuration of the image processing device in accordance with the related art.
Figure 8:
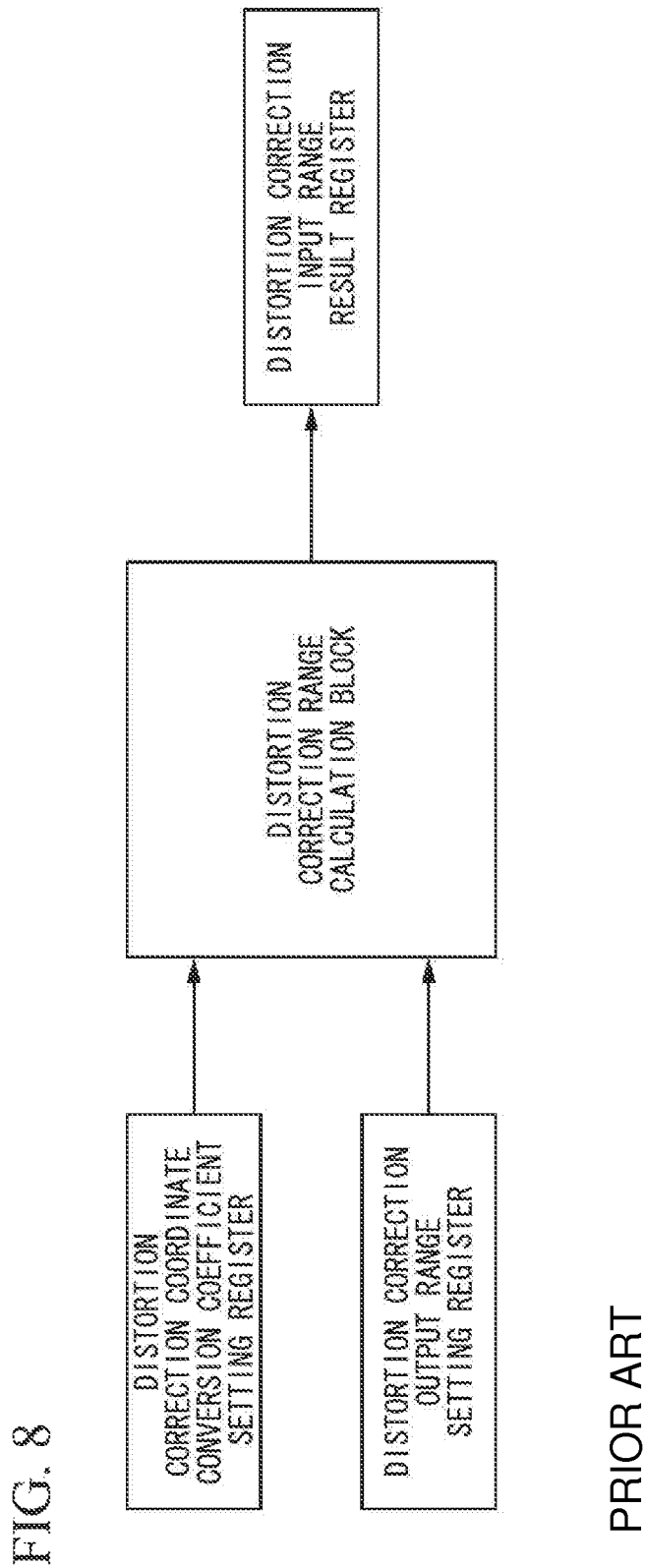
FIG. 8 is a block diagram illustrating a schematic configuration of the distortion correction range calculation unit included in the image processing device in accordance with the related art.
Figure 9:
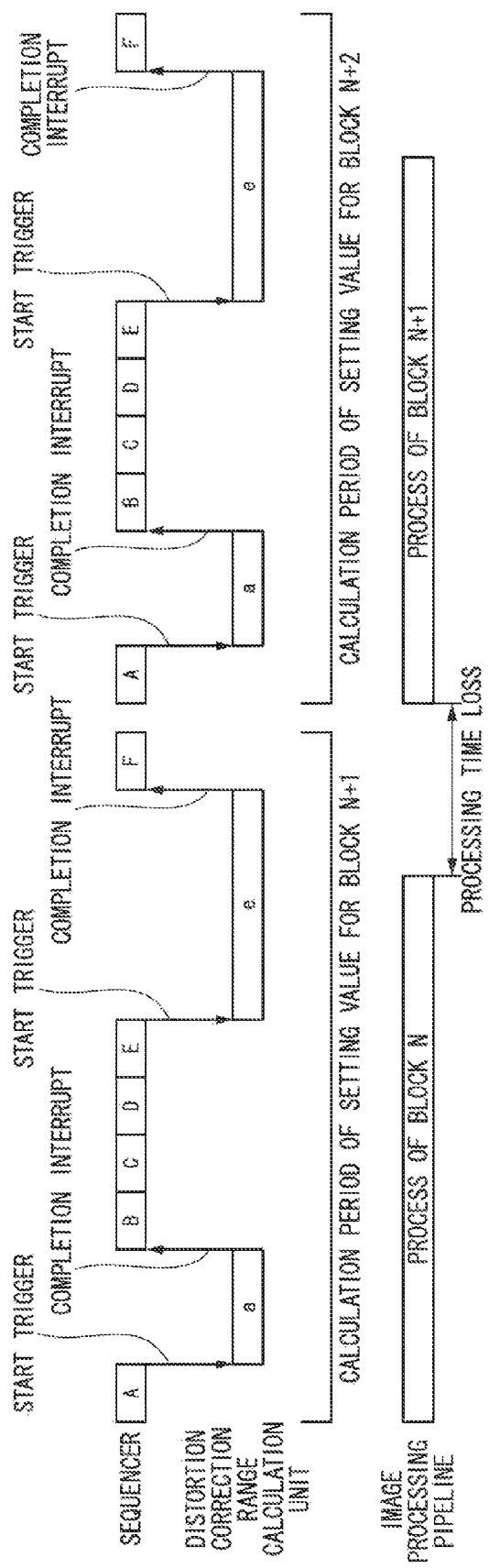
FIG. 9 is a timing chart illustrating timings when the distortion correction process in pipeline processing in the image processing device in accordance with the related art is divided and performed.

Next, the operation of the distortion correction range calculation unit 30 will be described with reference to FIG. 4 and FIG. 5A to FIG. 5C. FIG. 4 is a flowchart illustrating the procedure of the calculation process of the input range by the distortion correction range calculation unit 30 included in the image processing device 1 in accordance with the first preferred embodiment of the present invention. FIG. 5A to FIG. 5C are diagrams schematically illustrating an example of the operation of the calculation process of the input range by the distortion correction range calculation unit 30 included in the image processing device 1 in accordance with the first preferred embodiment of the present invention.

Before starting the pipeline processing of block image data, the sequencer 20 calculates the input range of image data before image processing, which corresponds to the output range of block image data to be output through the image processing of the magnification chromatic aberration correction processing unit 50, the YC processing unit 60, the NR processing unit 70, and the distortion aberration correction processing unit 80 constituting the pipeline. In step S10, the sequencer 20 performs setting required for the distortion aberration correction coordinate conversion coefficient setting register 31, the distortion aberration correction output range setting register 32, the image processing margin setting register 33 between magnification chromatic aberration and distortion aberration, and the magnification chromatic aberration correction coordinate conversion coefficient setting register 34.

In more detail, the sequencer 20 sets the distortion aberration correction coordinate conversion coefficient in the distortion aberration correction coordinate conversion coefficient setting register 31 of the distortion correction range calculation unit 30, and sets the distortion aberration correction output range in the distortion aberration correction output range setting register 32 thereof. Here, a distortion aberration correction output range A illustrated in FIG. 5A is assumed to be set as the distortion aberration correction output range to be set in the distortion aberration correction output range setting register 32. Furthermore, the sequencer 20 sets the image processing margin between magnification chromatic aberration and distortion aberration in the image processing margin setting register 33 between magnification chromatic aberration and distortion aberration. Here, an image processing margin cd between magnification chromatic aberration and distortion aberration illustrated in FIG. 5B is assumed to be set as the image processing margin between magnification chromatic aberration and distortion aberration to be set in the image processing margin setting register 33 between magnification chromatic aberration and distortion aberration. Furthermore, the sequencer 20 sets the magnification chromatic aberration correction coordinate conversion coefficient in the magnification chromatic aberration correction coordinate conversion coefficient setting register 34.

In step S20, the sequencer 20 applies (outputs) a start trigger to the distortion correction range calculation unit 30. In this way, in step S30 and subsequent steps, the start trigger is input to the distortion correction range calculation unit 30 from the sequencer 20, resulting in the start of the calculation processes of the input range of block image data before the distortion aberration correction process by the distortion aberration correction processing unit 80 and the input range of block image data before the magnification chromatic aberration correction process by the magnification chromatic aberration correction processing unit 50.

In step S30, the control unit 351 initially outputs a control signal to the selector 352 to select the distortion aberration correction coordinate conversion coefficient set in the distortion aberration correction coordinate conversion coefficient setting register 31, and outputs a control signal to the selector 356 to select the distortion aberration correction output range set in the distortion aberration correction output range setting register 32. In this way, the distortion aberration correction coordinate conversion coefficient and the distortion aberration correction output range are input to the coordinate conversion unit 353.

Then, the control unit 351 allows the coordinate conversion unit 353 to start the calculation process of the distortion correction input range. The coordinate conversion unit 353 employs the distortion aberration correction output range A input from the selector 356 as the output range of block image data to be output, and performs coordinate conversion on the position (the coordinates) of each pixel in block image data before the distortion aberration correction process, which corresponds to each pixel included in block image data in the distortion aberration correction output range A, based on the distortion aberration correction coordinate conversion coefficient input from the selector 352. In this way, an input area a of block image data in a distorted state due to distortion aberration as illustrated in FIG. 5A is obtained. Then, the coordinate conversion unit 353 calculates a rectangular range, which is circumscribed about (surrounds) the input area a obtained through the coordinate conversion, as the distortion aberration correction input range B (refer to FIG. 5A), and outputs the calculated distortion aberration correction input range B to the selector 354. Furthermore, the coordinate conversion unit 353 outputs a completion interrupt to the control unit 351, wherein the completion interrupt represents that the calculation of the distortion aberration correction input range B has been completed.

In step S40, the control unit 351 outputs a control signal to the selector 354 to select the distortion aberration correction input range result register 36 as an output destination of the distortion correction input range input from the coordinate conversion unit 353. In this way, the distortion aberration correction input range B calculated by the coordinate conversion unit 353 is output to and held in the distortion aberration correction input range result register 36.

In step S50, the control unit 351 outputs the completion interrupt input from the coordinate conversion unit 353 to the sequencer 20 as the completion interrupt 1 representing that the calculation of the distortion aberration correction input range B has been completed by the distortion correction range calculation unit 30. In this way, it is possible for the sequencer 20 to read the distortion aberration correction input range B held in the distortion aberration correction input range result register 36, and to set the distortion aberration correction input range B in the distortion aberration correction processing unit 80.

In step S60, the range expansion unit 355 adds the image processing margin cd between magnification chromatic aberration and distortion aberration, which has been set in the image processing margin setting register 33 between magnification chromatic aberration and distortion aberration, to the distortion aberration correction input range B held in the distortion aberration correction input range result register 36, thereby calculating a magnification chromatic aberration correction output range E obtained by expanding the distortion correction output range.

In step S70, the control unit 351 initially outputs a control signal to the selector 352 to select the magnification chromatic aberration correction coordinate conversion coefficient set in the magnification chromatic aberration correction coordinate conversion coefficient setting register 34, and outputs a control signal to the selector 356 to select the magnification chromatic aberration correction output range E calculated by the range expansion unit 355. In this way, the magnification chromatic aberration correction coordinate conversion coefficient and the magnification chromatic aberration correction output range E are input to the range expansion unit 355.

Then, the control unit 351 allows the coordinate conversion unit 353 to start the calculation process of the distortion correction input range again. The coordinate conversion unit 353 employs the magnification chromatic aberration correction output range E input from the selector 356 as the output range of block image data to be output, and performs coordinate conversion on the position (the coordinates) of each pixel in block image data before the magnification chromatic aberration correction process, which corresponds to each pixel included in block image data in the magnification chromatic aberration correction output range E, based on the magnification chromatic aberration correction coordinate conversion coefficient input from the selector 352. In this way, an input area e of block image data in a distorted state due to magnification chromatic aberration as illustrated in FIG. 5C is obtained. Then, the coordinate conversion unit 353 calculates a rectangular range, which is circumscribed about (surrounds) the input area e obtained through the coordinate conversion, as a magnification chromatic aberration correction input range F (refer to FIG. 5C), and outputs the calculated magnification chromatic aberration correction input range F to the selector 354. Furthermore, the coordinate conversion unit 353 outputs a completion interrupt to the control unit 351, wherein the completion interrupt represents that the calculation of the magnification chromatic aberration correction input range F has been completed.

In step S80, the control unit 351 outputs a control signal to the selector 354 to select the magnification chromatic aberration correction input range result register 37 as an output destination of the distortion correction input range input from the coordinate conversion unit 353. In this way, the magnification chromatic aberration correction input range F calculated by the coordinate conversion unit 353 is output to and held in the magnification chromatic aberration correction input range result register 37.

In step S90, the control unit 351 outputs the completion interrupt input from the coordinate conversion unit 353 to the sequencer 20 as the completion interrupt 2 representing that the calculation of the magnification chromatic aberration correction input range F has been completed by the distortion correction range calculation unit 30, and completes the calculation process of the input range of the block image data. In this way, it is possible for the sequencer 20 to read the magnification chromatic aberration correction input range F held in the magnification chromatic aberration correction input range result register 37, and to set the magnification chromatic aberration correction input range F in the magnification chromatic aberration correction processing unit 50.

In this way, the distortion correction range calculation unit 30 initially calculates the distortion aberration correction input range B, calculates the magnification chromatic aberration correction output range E based on the calculated distortion aberration correction input range B and image processing margin between magnification chromatic aberration and distortion aberration, and further calculates the magnification chromatic aberration correction input range F. Consequently, it is possible for the distortion correction range calculation unit 30 to automatically and continuously perform the calculation of the input range of the block image data before the distortion aberration correction process by the distortion aberration correction processing unit 80 and the calculation of the input range of the block image data before the magnification chromatic aberration correction process by the magnification chromatic aberration correction processing unit 50 in response to the one-time start trigger input from the sequencer 20.

Consequently, in the image processing device 1, it is possible for the sequencer 20 to set the distortion aberration correction input range B, which has been held in the distortion aberration correction input range result register 36, and the magnification chromatic aberration correction input range F, which has been held in the magnification chromatic aberration correction input range result register 37, in the distortion aberration correction processing unit 80 and the magnification chromatic aberration correction processing unit 50, respectively. Furthermore, in the image processing device 1, the distortion correction range calculation unit 30 automatically calculates the magnification chromatic aberration correction input range F, so that it is possible to perform the calculation and setting of the input ranges of image data, which are required for the NR processing unit 70 and the YC processing unit 60 and performed by the sequencer 20 itself, during the calculation of the magnification chromatic aberration correction input range F. Furthermore, after setting the magnification chromatic aberration correction input range F in the magnification chromatic aberration correction processing unit 50, it is possible for the sequencer 20 to set the size or position of block image data (block Bayer data) to be read by the input DMA unit 40, and to perform the pipeline processing of the image processing device 1.

Hereinafter, the pipeline processing of the image processing device 1 will be described. FIG. 6 is a timing chart illustrating timings of the pipeline processing of the image processing device 1 in accordance with the first preferred embodiment of the present invention. In addition, the timing chart illustrated in FIG. 6 illustrates timings when the setting of the image processing units (the magnification chromatic aberration correction processing unit 50, the YC processing unit 60, the NR processing unit 70, and the distortion aberration correction processing unit 80) is performed in order to perform pipeline processing of a block N+1 while a pipeline processing of a block N is being performed.

If the pipeline processing of the block N is started, the sequencer 20 initially performs the setting required for each register in the distortion correction range calculation unit 30, outputs a start trigger, and allows the calculation process of the input range to be started in the process A.

In this way, the distortion correction range calculation unit 30 performs the calculation process a (steps S30, S40, and S50 illustrated in FIG. 4) of the input range (the distortion aberration correction input range B illustrated in FIG. 5A) of the block image data before the distortion aberration correction process by the distortion aberration correction processing unit 80, and outputs the completion interrupt 1 to the sequencer 20. Then, the distortion correction range calculation unit 30 performs the calculation process e (steps S60, S70, S80, and S90 illustrated in FIG. 4) of the input range (the magnification chromatic aberration correction input range F illustrated in FIG. 5C) of the block image data before the magnification chromatic aberration correction process by the magnification chromatic aberration correction processing unit 50.

If the completion interrupt 1 is input from the distortion correction range calculation unit 30, the sequencer 20 sets the distortion aberration correction input range B calculated by the distortion correction range calculation unit 30 in the distortion aberration correction processing unit 80 in the process B.

Then, in the process C, the sequencer 20 calculates the input range of the image data required for the NR processing unit based on the distortion aberration correction input range B calculated by the distortion correction range calculation unit 30, and performs the setting required for the NR processing unit based on the calculated input range of the image data. Then, in the process D, the sequencer 20 calculates the input range of the image data required for the YC processing unit based on the calculated input range of the image data required for the NR processing unit, and performs the setting required for the YC processing unit based on the calculated input range of the image data.

Thereafter, if the calculation process e is completed, the distortion correction range calculation unit 30 outputs the completion interrupt 2 to the sequencer 20. If the completion interrupt 2 is input from the distortion correction range calculation unit 30, the sequencer 20 sets the magnification chromatic aberration correction input range F calculated by the distortion correction range calculation unit 30 in the magnification chromatic aberration correction processing unit 50 in the process F. Consequently, it is possible to start the pipeline processing of the next block N+1.

In this way, the sequencer 20 performs in advance the calculation and setting operations of the input range of the block image data when performing the pipeline processing of the next block N+1. Then, the sequencer 20 performs an operation for performing pipeline processing of a next block N+2 and subsequent blocks in the same manner.

As apparent from FIG. 6, even in the period in which the distortion correction range calculation unit 30 performs the calculation process of the input range, it is possible for the sequencer 20 to perform the setting required for the NR processing unit 70 or the setting required for the YC processing unit 60. Consequently, in the image processing device 1, it is possible to shorten a period in which the sequencer 20 waits for the calculation result of the distortion correction range calculation unit 30, that is, the sequencer 20 performs no operation, as compared with the pipeline processing of the image processing device in the related art. Consequently, in the image processing device 1, it is possible to remove the loss time in processing time of the pipeline processing.

As described above, according to the preferred embodiment of the present invention, the coordinate conversion coefficients of the magnification chromatic aberration correction and the distortion aberration correction are separately set in the distortion correction range calculation unit. Furthermore, the number (a difference between an input range and an output range of another image processing unit) of image data, which is lost by another image processing performed between the magnification chromatic aberration correction and the distortion aberration correction, is set in the distortion correction range calculation unit. Then, in response to a one-time start trigger input from the sequencer, the distortion correction range calculation unit automatically performs the calculation of the input range of image data to be set in the magnification chromatic aberration correction processing unit subsequent to the calculation of the input range of image data to be set in the distortion aberration correction processing unit. Consequently, in the image processing device of the preferred embodiment of the present invention, even in the case of a so-called a pipeline of one bus having a configuration in which the magnification chromatic aberration correction processing unit and the distortion aberration correction processing unit corresponding to image processing for correcting the distortion of an optical system are separately included in one pipeline, it is possible to accurately calculate input ranges suitable for the magnification chromatic aberration correction and the distortion aberration correction. Furthermore, in the image processing device of the preferred embodiment of the present invention, since the magnification chromatic aberration correction processing unit and the distortion aberration correction processing unit are included in one pipeline (the pipeline of one bus), there is no pressure to the bus band of the DRAM caused by the image processing without an increase in the number of accesses regarding the image processing for the DRAM.

Furthermore, according to the preferred embodiment of the present invention, in the period in which the distortion correction range calculation unit calculates the input ranges of the image data to be set in the magnification chromatic aberration correction processing unit and the distortion aberration correction processing unit, it is possible for the sequencer to perform the calculation and setting of the input range of image data required for another image processing unit, which are performed between the magnification chromatic aberration correction processing unit and the distortion aberration correction processing unit. Consequently, in the image processing device according to the preferred embodiment of the present invention, it is possible to shorten a period in which the sequencer waits for the completion of the process of the distortion correction range calculation unit, that is, performs no operation. Consequently, in the image processing device according to the preferred embodiment of the present invention, it is possible to remove the loss time in processing time occurring between respective pipeline processes in the pipeline processing of the image processing device in the related art. Consequently, it is possible to increase an image processing speed in the image processing device according to the preferred embodiment of the present invention.

In addition, in the first preferred embodiment of the present invention, the case in which the image processing performed between the magnification chromatic aberration correction processing unit 50 and the distortion aberration correction processing unit 80 is the image processing performed by the YC processing unit 60 and the NR processing unit 70 has been described. However, the image processing performed between the magnification chromatic aberration correction processing unit 50 and the distortion aberration correction processing unit 80 is not limited to the preferred embodiment of the present invention. For example, various image processing may be performed. In this case, an image processing margin between the magnification chromatic aberration and the distortion aberration based on the characteristics of the image processing performed between the magnification chromatic aberration correction processing unit 50 and the distortion aberration correction processing unit 80 is set in the image processing margin setting register 33 between magnification chromatic aberration and distortion aberration of the distortion correction range calculation unit 30.

Furthermore, in the first preferred embodiment of the present invention, the coordinate conversion coefficients of the magnification chromatic aberration correction and the distortion aberration correction are separately set in the distortion correction range calculation unit. In general, the amount of distortion in the magnification chromatic aberration is considered to be smaller than that in the distortion aberration. Thus, it is possible to make the coordinate conversion coefficient of the magnification chromatic aberration correction smaller than the coordinate conversion coefficient of the distortion aberration correction.

In addition, in the first preferred embodiment of the present invention, the case in which the distortion correction range calculation unit 30 calculates both the distortion aberration correction input range B set in the distortion aberration correction processing unit 80 and the magnification chromatic aberration correction input range F set in the magnification chromatic aberration correction processing unit 50 has been described. However, it may be possible to employ a configuration in which the distortion correction range calculation unit 30 calculates any one input range, that is, separately calculates the distortion aberration correction input range B and the magnification chromatic aberration correction input range F.

For example, in the case of calculating only the distortion aberration correction input range B, it can be realized by employing a configuration in which the sequencer 20 applies (outputs) a start trigger without setting the image processing margin setting register 33 between magnification chromatic aberration and distortion aberration, and the magnification chromatic aberration correction coordinate conversion coefficient setting register 34, and ignores the completion interrupt 2 input from the distortion correction range calculation unit 30.

Furthermore, for example, it can be realized by employing a configuration in which the control unit 351 calculates only the distortion aberration correction input range B in response to the start trigger for the distortion aberration correction input from the sequencer 20, and by employing a configuration in which the sequencer 20 applies (outputs) the start trigger for the distortion aberration correction after setting the distortion aberration correction coordinate conversion coefficient setting register 31 and the distortion aberration correction output range setting register 32.

Furthermore, for example, in the case of calculating only the magnification chromatic aberration correction input range F, it can be realized by employing a configuration of setting the magnification chromatic aberration correction coordinate conversion coefficient in the distortion aberration correction coordinate conversion coefficient setting register 31, and setting the range of the block image data (the block Bayer data) after the magnification chromatic aberration correction, which is output from the magnification chromatic aberration correction processing unit 50, in the distortion aberration correction output range setting register 32, instead of the distortion aberration correction output range. Furthermore, for example, it can be realized by employing a configuration in which the control unit 351 calculates only the magnification chromatic aberration correction input range F in response to the start trigger for the magnification chromatic aberration correction input from the sequencer 20, and by employing a configuration in which the sequencer 20 applies (outputs) the start trigger for the magnification chromatic aberration correction in the state in which the distortion aberration correction input range B is held in the distortion aberration correction input range result register 36.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An image processing device comprising:
an image processing pipeline in which at least a magnification chromatic aberration correction processing unit that corrects magnification chromatic aberration of an imaging optical system, a distortion aberration correction processing unit that corrects distortion aberration of the imaging optical system, and an imaging processing unit that performs image processing with respect to image data and outputs image processed-image data to the distortion aberration correction processing unit are included in one pipeline, magnification chromatic aberration of the image data having been corrected by the magnification chromatic aberration correction processing unit;
a sequencer that controls operations of respective elements included in the image processing pipeline; and
a distortion correction range calculation unit that calculates a distortion aberration correction input range, which represents an input range of the image processed-image data input to the distortion aberration correction processing unit, based on a preset distortion aberration correction output range representing an output range of distortion aberration-corrected image data output from the distortion aberration correction processing unit, and a preset distortion aberration correction coordinate conversion coefficient for converting coordinates representing a position of each pixel included in the distortion aberration correction output range to coordinates representing a position of each pixel before the distortion aberration is corrected, and further calculates a magnification chromatic aberration correction input range, which represents an input range of image data input to the magnification chromatic aberration correction processing unit, based on the calculated distortion aberration correction input range, a preset image processing margin determined based on characteristics of the image processing unit, and a preset magnification chromatic aberration correction coordinate conversion coefficient for converting coordinates representing a position of each pixel included in an output range of magnification chromatic aberration-corrected image data output from the magnification chromatic aberration correction processing unit to coordinates representing a position of each pixel before the magnification chromatic aberration is corrected, wherein
the sequencer sends a command indicating an one-time calculation operation start control to the distortion correction range calculation unit one, and
the distortion correction range calculation unit continuously performs calculation of the distortion aberration correction input range and calculation of the magnification chromatic aberration correction input range in response to one-time calculation operation start control from the sequencer, and sequentially outputs an interrupt signal representing that the calculation of the distortion aberration correction input range has been completed, and an interrupt signal representing that the calculation of the magnification chromatic aberration correction input range has been completed to the sequencer, whenever the calculation of the distortion aberration correction input range or the calculation of the magnification chromatic aberration correction input range is completed.

2. The image processing device according to claim 1, wherein the distortion correction range calculation unit comprises:
   a coordinate conversion unit that calculates an input range of image data based on an output range of the image data and a coordinate conversion coefficient for converting coordinates representing a position of each pixel included in the output range;
   a distortion aberration correction input range holding unit that holds the input range of the image data calculated by the coordinate conversion unit as the distortion aberration correction input range;
   a coordinate conversion coefficient selection unit that selects one of the distortion aberration correction coordinate conversion coefficient and the magnification chromatic aberration correction coordinate conversion coefficient;
   a range expansion unit that expands the distortion aberration correction input range held in the distortion aberration correction input range holding unit based on the image processing margin, thereby calculating a magnification chromatic aberration correction output range representing the output range of the magnification chromatic aberration-corrected image data output from the magnification chromatic aberration correction processing unit; and
   an output range selection unit that selects one of the distortion aberration correction output range and the magnification chromatic aberration correction output range calculated by the range expansion unit, wherein,
   when calculating the distortion aberration correction input range, the coordinate conversion coefficient selection unit selects the distortion aberration correction coordinate conversion coefficient and outputs the selected distortion aberration correction coordinate conversion coefficient to the coordinate conversion unit as the coordinate conversion coefficient, the output range selection unit selects the distortion aberration correction output range and outputs the selected distortion aberration correction output range to the coordinate conversion unit as the output range of the image data, and the coordinate conversion unit calculates the distortion aberration correction input range based on the input distortion aberration correction output range and distortion aberration correction coordinate conversion coefficient, and outputs the calculated distortion aberration correction input range to the distortion aberration correction input range holding unit, and
   when calculating the magnification chromatic aberration correction input range, the coordinate conversion coefficient selection unit selects the magnification chromatic aberration correction coordinate conversion coefficient and outputs the selected magnification chromatic aberration correction coordinate conversion coefficient to the coordinate conversion unit as the coordinate conversion coefficient, the output range selection unit selects the magnification chromatic aberration correction output range and outputs the selected magnification chromatic aberration correction output range to the coordinate conversion unit as the output range of the image data, and the coordinate conversion unit calculates the magnification chromatic aberration correction input range based on the input magnification chromatic aberration correction output range and magnification chromatic aberration correction coordinate conversion coefficient.

3. The image processing device according to claim 2, wherein,
   in the image processing pipeline, the image processing margin corresponds to a difference between the input range of the image data input to the image processing unit positioned between the magnification chromatic aberration correction processing unit and the distortion aberration correction processing unit and the output range of the image processed-image data output through the image processing of the image processing unit.

4. The image processing device according to claim 3, wherein
   the difference between the input range of the image data input to the image processing unit and the output range of the image processed-image data output from the image processing unit corresponds to the number of image data to be lost by the image processing performed by the image processing unit.

5. The image processing device according to claim 4, wherein
   the number of image data is calculated based on characteristics of a filter included in the image processing unit.

6. An image processing method of an image processing device, which includes an image processing pipeline in which at least a magnification chromatic aberration correction processing unit that corrects magnification chromatic aberration of an imaging optical system, a distortion aberration correction processing unit that corrects distortion aberration of the imaging optical system, and an imaging processing unit that performs image processing with respect to image data and outputs image processed-image data to the distortion aberration correction processing unit are included in one pipeline, magnification chromatic aberration of the image data having been corrected by the magnification chromatic aberration correction processing unit, a sequencer that controls operations of respective elements included in the image processing pipeline, and a distortion correction range calculation unit that calculates a distortion aberration correction input range, which represents an input range of the image processed-image data input to the distortion aberration correction processing unit, based on a preset distortion aberration correction output range and a preset distortion aberration correction coordinate conversion coefficient, and further calculates a magnification chromatic aberration correction input range, which represents an input range of image data input to the magnification chromatic aberration correction processing unit, based on the calculated distortion aberration correction input range, a preset image processing margin, and a preset magnification chromatic aberration correction coordinate conversion coefficient, wherein the sequencer performs:
   a step of setting in advance, in the distortion correction range calculation unit, the distortion aberration correction output range representing an output range of distortion aberration-corrected image data output from the distortion aberration correction processing unit, the distortion aberration correction coordinate conversion coefficient for converting coordinates representing a position of each pixel included in the distortion aberration correction output range to coordinates representing a position of each pixel before distortion aberration is corrected, the image processing margin determined based on characteristics of the image processing unit, and the magnification chromatic aberration correction coordinate conversion coefficient for converting coordinates representing a position of each pixel included in an output range of magnification chromatic aberration-corrected image data output from the magnification chromatic aberration correction processing unit to coordinates representing a position of each pixel before magnification chromatic aberration is corrected;

a step of outputting one-time calculation operation start control, and continuously allowing the distortion correction range calculation unit to perform calculation of the distortion aberration correction input range and the magnification chromatic aberration correction processing unit to perform calculation of the magnification chromatic aberration correction input range;

a step of acquiring the calculated distortion aberration correction input range when an interrupt signal representing that the calculation of the distortion aberration correction input range has been completed is received from the distortion correction range calculation unit; and a step of acquiring the calculated magnification chromatic aberration correction input range when an interrupt signal representing that the calculation of the magnification chromatic aberration correction input range has been completed is received from the distortion correction range calculation unit.

\* \* \* \* \*